United States Patent
Endo (10) Patent No.: US 8,885,026 B2
(45) Date of Patent: Nov. 11, 2014

(54) IMAGING DEVICE AND IMAGING METHOD

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/039,700

(22) Filed: Sep. 27, 2013

(65) Prior Publication Data

US 2014/0028806 A1    Jan. 30, 2014

Related U.S. Application Data

(63) Continuation of application No. PCT/JP2012/055762, filed on Mar. 7, 2012.

(30) Foreign Application Priority Data

Mar. 31, 2011 (JP) .................. 2011-079222

(51) Int. Cl.
*H04N 13/02* (2006.01)
*G02B 7/36* (2006.01)
*G02B 7/34* (2006.01)

(52) U.S. Cl.
CPC ....... *H04N 13/0217* (2013.01); *H04N 13/0207* (2013.01); *G02B 7/365* (2013.01); *H04N 13/0285* (2013.01); *H04N 13/0257* (2013.01); *G02B 7/34* (2013.01)
USPC ............... 348/49; 348/46; 348/340; 382/154

(58) Field of Classification Search
CPC ............ H04N 13/021; H04N 13/0239; H04N 13/0438; H04N 13/0217; H04N 13/0296
USPC .............. 348/46, 49; 382/103, 106, 107, 117, 382/118, 154
See application file for complete search history.

(56) References Cited

U.S. PATENT DOCUMENTS 6,807,295 B1   10/2004  Ono
8,120,606 B2   2/2012   Nakamura et al.
(Continued)

FOREIGN PATENT DOCUMENTS

JP    8-331607 A    12/1996
JP    2000-102040 A    4/2000
(Continued)

OTHER PUBLICATIONS

International Search Report issued in PCT/JP2012/055762, mailed on May 29, 2012.
(Continued)

*Primary Examiner* — Jay Au Patel
*Assistant Examiner* — Neil Mikeska
(74) *Attorney, Agent, or Firm* — Birch, Stewart, Kolash & Birch, LLP (57) ABSTRACT

An imaging device, comprising: an imaging unit having first pixels configured to photoelectrically convert a subject image which is imaged with a photographic lens and to output a first image signal, and second pixels configured to be placed discretely between the first pixels so as to photoelectrically convert each of a plurality of subject images which come from divided pupil regions formed by dividing a pupil region of the photographic lens and to output second image signals having a phase difference; an imaging control unit; a parallax information calculation unit; a plane image generation unit; and a blurring processing unit configured to determine target pixels in the plane image which are to be subjected to blurring processing, based on the parallax information calculated by the parallax information calculation unit, and to perform blurring processing on the determined target pixels in the plane image.

12 Claims, 8 Drawing Sheets

(56) References Cited

U.S. PATENT DOCUMENTS

| | | |
|---|---|---|
| 8,184,171 B2 | 5/2012 | Tamaru |
| 2008/0240517 A1 | 10/2008 | Okamoto |
| 2011/0063484 A1 | 3/2011 | Fujii et al. |
| 2011/0122308 A1* | 5/2011 | Duparre ........................ 348/340 |

FOREIGN PATENT DOCUMENTS

| | | |
|---|---|---|
| JP | 2001-12916 A | 1/2001 |
| JP | 2001-16611 A | 1/2001 |
| JP | 2002-191060 A | 7/2002 |
| JP | 2003-7994 A | 1/2003 |
| JP | 2003-209727 A | 7/2003 |
| JP | 2003-209858 A | 7/2003 |
| JP | 2006-67521 A | 3/2006 |
| JP | 2006-339784 A | 12/2006 |
| JP | 2007-104248 A | 4/2007 |
| JP | 2007-155929 A | 6/2007 |
| JP | 2008-15754 A | 1/2008 |
| JP | 2008-92007 A | 4/2008 |
| JP | 2008-116309 A | 5/2008 |
| JP | 2008-141666 A | 6/2008 |
| JP | 2008-244693 A | 10/2008 |
| JP | 2008-271241 A | 11/2008 |
| JP | 2008-294785 A | 12/2008 |
| JP | 2009-14445 A | 1/2009 |
| JP | 2009-89144 A | 4/2009 |
| JP | 2009-124308 A | 6/2009 |
| JP | 2009-232118 A | 8/2009 |
| JP | 2009-204987 A | 9/2009 |
| JP | 2010-206774 A | 9/2010 |
| JP | 2010-226391 A | 10/2010 |
| JP | 2010-226500 A | 10/2010 |
| WO | 2009/116652 A1 | 9/2009 |

OTHER PUBLICATIONS

PCT/ISA/237—Mailed on May 29, 2012, issued in PCT/JP2012/055762.

* cited by examiner

(PHASE DIFFERENCE PIXEL: G1* + R1* + B2*...)

(PHASE DIFFERENCE PIXEL: G1* + G3* +...)

FIG.7

(PHASE DIFFERENCE PIXEL: G1* + R1* + B2* + G2*...)

IMAGING DEVICE AND IMAGING METHOD

CROSS-REFERENCE TO RELATED APPLICATIONS

This application is a continuation application and claims the priority benefit under 35 U.S.C. §120 of PCT Application No. PCT/JP2012/055762 filed on Mar. 7, 2012 which application designates the U.S., and also claims the priority benefit under 35 U.S.C. §119 of Japanese Patent Application No. 2011-079222 filed on Mar. 31, 2011, which applications are all hereby incorporated by reference in their entireties.

BACKGROUND OF THE INVENTION

1. Field of the Invention

The present invention relates to an imaging device and an imaging method for forming subject images on an image sensor, which have respectively passed through different areas of a photographic lens in two or more directions, to acquire different viewpoint images. The present invention is more particularly relates to an imaging device and an imaging method for simultaneously imaging a stereoscopic image having parallax and a plane image.

2. Description of the Related Art

Conventionally, there has been a stereoscopic imaging device configured to form subject images, which have respectively passed through different areas of a photographic lens in two directions, on an image sensor to acquire different viewpoint images.

Figure 10:
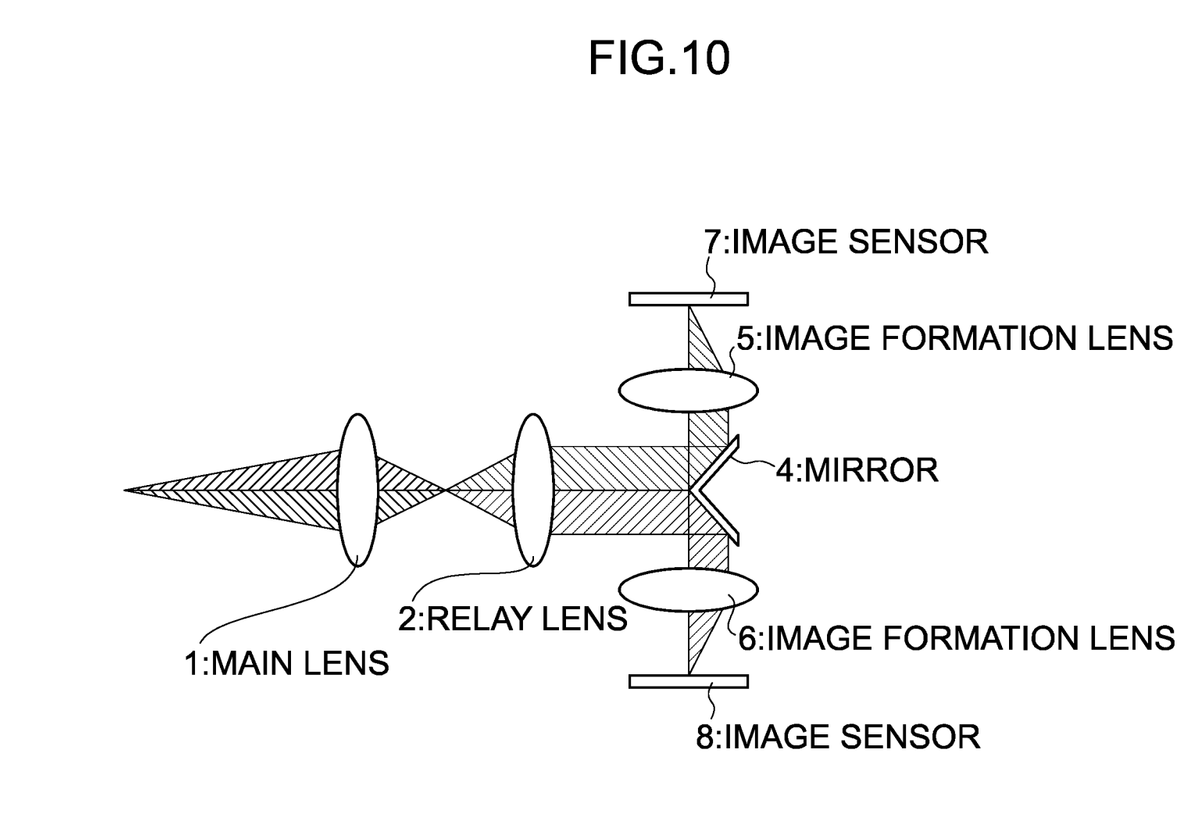
FIG. 10 is a view showing one example of a conventional monocular stereoscopic imaging device.

An optical system shown in FIG. 10 is configured to cause a mirror 4 to pupil-divide subject images that have passed through different horizontal areas of a main lens 1 and a relay lens 2, and to form the respective subject images on image sensors 7 and 8 through image formation lenses 5 and 6.

Figure 11:
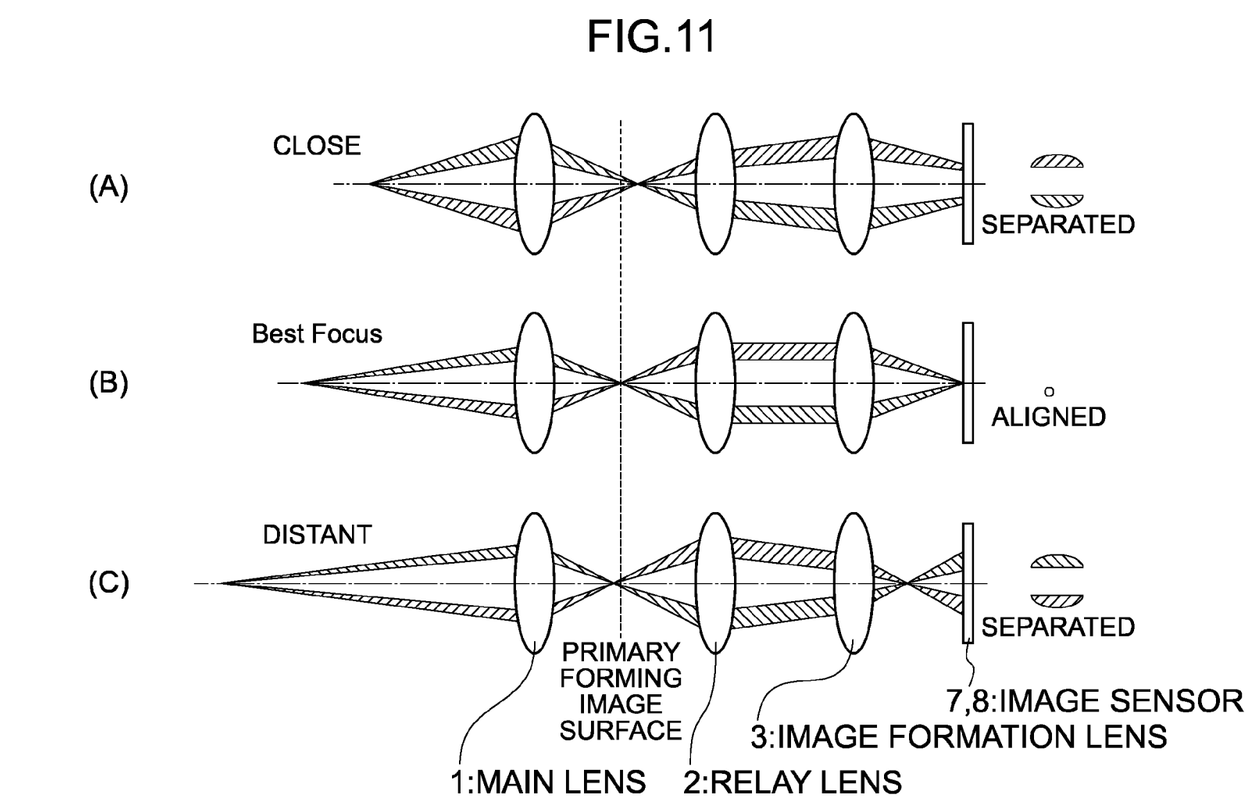
FIG. 11 is a view showing the state of separation of an image formed on an image sensor.

(A) to (C) portions of FIG. 11 are views showing the state of separation of images formed on the image sensor in the case of front focus, in-focus (best focus), and rear focus states. Note that in FIG. 11, the mirror 4 shown in FIG. 10 is omitted in order to compare differences in image separation depending on the focus states.

Among the pupil-divided images, the in-focus images are formed at the same position (are aligned) on the image sensor as shown in (B) portion of FIG. 11, whereas the front-focus and rear-focus images are formed at different positions (are separated) on the image sensor as shown in (A) and (C) portions of FIG. 11.

Therefore, by acquiring subject images which have been pupil-divided in the horizontal direction through the image sensors 7 and 8, it becomes possible to acquire a left viewpoint image and a right viewpoint image (3D image) having different viewpoints depending on subject distances.

According to Japanese Patent Application Laid-Open No. 2007-104248 (hereinafter referred to as Patent Literature 1), an electronic camera has an imaging unit, a light amount distribution detection unit, an image shift amount detection unit, and an image processing unit. The imaging unit is configured to photoelectrically convert a subject image obtained by the photographing optical system to generate photographed image data. The light amount distribution detection unit detects respective light amount distributions of luminous fluxes which have come from the subject and have passed through different optical paths. The image shift amount detection unit detects an image shift amount in a plurality of points within a photographing screen based on the light amount distributions. The image processing unit is configured to change, in the horizontal direction, positional relationship of the subject in the photographed image data based on the image shift amount in the plurality of points to generate stereogram image data. The image processing unit is also configured to change, in the horizontal direction, the positional relationship of the subject in the stereogram image data based on an input from an input unit to correct the stereogram image data. Since the stereogram image data can be corrected, it becomes possible to acquire a natural stereogram image, which causes less discomfort for users.

Japanese Patent Application Laid-Open No. 2009-124308 (hereinafter referred to as Patent Literature 2) discloses a method for generating a multi-viewpoint image, including: performing pattern matching between left-eye and right-eye stereo images photographed with two cameras on the left side and right side, using one of the stereo images as reference; specifying a matched image for each pixel; calculating an intermediate position image by interpolating an interpixel distance between images matched for each of the left and right pixels; and calculating a right outer image and a left outer image by extrapolating the interpixel distance between the images matched for each of the left and right pixels.

In Japanese Patent Application Laid-Open No. 2008-92007, paragraphs 0047 to 0048, and 0071 (hereinafter referred to as Patent Literature 3), a stereo matching processing unit (object detection means) detects one or more corresponding points (objects) corresponding to each other in search spaces set by the aforementioned space setting unit in two pieces of image data A and B which have been each processed by image processing units and stored in a memory section. A distance calculation unit (position calculation means) calculates three-dimensional coordinate values (position information) of the corresponding points detected by the above-stated stereo matching processing unit. Photographic lenses in photographing units are different in configuration. The photographic lens includes a zoom lens and an unshown zoom lens driving unit (driving means) that drives the zoom lens, while the photographic lens includes a fixed-focus lens with an angle of view equal to a wide angle end of the zoom lens of the photographic lens. Such configuration is employed to achieve cost reduction.

Japanese Patent Application Laid-Open No. 2003-7994, Japanese Patent Application Laid-Open No. 2001-12916, and Japanese Patent Application Laid-Open No. 2001-016611 (hereinafter referred to as Patent Literatures 4 to 6) are examples of a three-dimensional image generation technology with use of a single optical system. For example, Patent Literature 4 discloses a solid-state image sensor configured to include a large number of pixels arrayed on the same imaging surface and to photoelectrically convert a subject image formed on the imaging surface so as to generate an image signal. In the solid-state image sensor, the large number of pixels is divided into two groups, and pixels in the respective groups are made to have different light incident angles.

Japanese Patent Application Laid-Open No. 08-331607, Japanese Patent Application Laid-Open No. 2008-141666, Japanese Patent Application Laid-Open No. 2009-14445, Japanese Patent Application Laid-Open No. 2008-116309, and Japanese Patent Application Laid-Open No. 2000-102040 (hereinafter referred to as Patent Literatures 7 to 11) disclose examples of a method for searching corresponding points between different viewpoint images, a technology for acquiring depth information by stereo matching, and a three-dimensional image generation technology involving use of two-dimensional images and distance information (depth information).

In Japanese Patent Application Laid-Open No. 2008-271241 (hereinafter referred to as Patent Literature 12), the focus is placed only on a main subject and portions other than the main subject are intentionally defocused. Accordingly, a plurality of images are obtained by successively photographing images while discretely moving focal positions by a predetermined moving amount, and the thus obtained images are synthesized so that a blur-emphasized image can be obtained.

In Japanese Patent Application Laid-Open No. 2003-209727 (hereinafter referred to as Patent Literature 13), an image to be photographed is divided into a plurality of areas, and the areas, which are to be a foreground and a background of a main subject, are imaged with a focal position shifted from a focal position corresponding to a distance of the areas. Images of respective areas are individually extracted from the images imaged for each area, and these images are synthesized to form one image. This makes it possible to easily photograph an image with a desired blur amount.

Japanese Patent Application Laid-Open No. 2010-226500 (hereinafter referred to as Patent Literature 14) shows one example of a method for generating a parallax map.

In Japanese Patent Application Laid-Open No. 2003-209858 (hereinafter referred to as Patent Literature 15), parallax values in a parallax value distribution image are linearly or nonlinearly converted for parallax value adjustment, so that parallax value configuration is changed to depth value configuration of multi-viewpoint stereoscopic images, which is adapted to simultaneously fulfill both conditions for stereoscopic image designing, that is, "adopting a viewpoint which effectively uses a maximum amount of protrusion and a maximum amount of depression while limiting these amounts within a certain maximum parallax range" and "nulling parallax at a main subject position in an image as much as possible" and to effectively use the maximum parallax value range. By using a modified parallax value distribution image and viewpoint positions, i.e., by using a ratio r of each of a pair of inputted right and left stereo images to the parallax between these images corresponding to the viewpoint positions, a virtual viewpoint image of each view position is generated, and thereby a new viewpoint image all the pixels of which are effective is generated. This processing is repeated for the number of viewpoints as a multi-viewpoint image sequence. Three-dimensional strip images are synthesized from the multi-viewpoint image sequence. In this case, a three-dimensional image is synthesized so that pixels at the same coordinates in respective images in the multi-viewpoint image sequence are arranged as adjacent pixels in accordance with viewpoint placement of the images. In the synthesizing processing, the image of each viewpoint is cut into strips per line in a vertical direction, and the strips are combined for the number of each viewpoint in a reverse order of the viewpoint positions. Here, the images are synthesized in the reverse order of the arrangement of viewpoint positions because when images are observed through a lenticular board, left and right images are reversely observed in one lenticular pitch. If the lenticular board is overlapped with an image printed by this processing, a successful stereoscopic image can be observed.

A 3D image output apparatus according to Japanese Patent Application Laid-Open No. 2010-206774 (hereinafter referred to as Patent Literature 16) selects a parallax adjustment parameter in accordance with a screen size or viewing distance of a 3D display, converts the parallax amount at each characteristic point with use of a selected conversion table, generates a parallax image corresponding to the converted parallax amount, and outputs a plurality of parallax images including the generated parallax image to a display device. The viewing distance is automatically acquired by a distance measurement means provided on a 3D display or adjacent thereto or manually inputted. The 3D image output apparatus outputs parallax images to a stereoscopic display device which has various screen sizes, a printer which generates stereoscopic display prints, and the like.

In a pupil dividing-type stereoscopic imaging device configured to image parallax images by selectively acquiring image information that have passed through different pupil positions in image formation means, to generate a stereoscopic image as in Patent Literatures 4 to 6, parallax becomes 0 at the in-focus position, while at the out-of-focus position, parallax is generated corresponding to blurring (defocus amount).

Accordingly, in order to obtain a plane image without blurring in the stereoscopic imaging device, it is necessary to photograph an image with a narrowed diaphragm aperture and a deeper focus depth. However, if photographing is carried out with a narrowed diaphragm aperture, it is not possible to blur the foreground and the background in contrast to the main subject. In the pupil dividing-type stereoscopic imaging device, since photographing is carried out with a narrowed diaphragm aperture in order to obtain a clear plane image, creative image formation is limited.

SUMMARY OF THE INVENTION

The present invention provides a pupil dividing-type stereoscopic imaging device which can simultaneously acquire both a plane image and a stereoscopic image in which a desired portion, such as a foreground and a background, is blurred in contrast to a main subject, and a method for simultaneously imaging the plane image and the stereoscopic image in the pupil dividing-type stereoscopic imaging device.

A first aspect of the present invention provides an imaging device, including: an imaging unit having first pixels configured to photoelectrically convert, with use of a photoelectric conversion element group, a subject image which is imaged with a photographic lens and to output first image signals, and second pixels configured to be placed discretely between the first pixels so as to photoelectrically convert, with use of a photoelectric conversion element group, each of a plurality of subject images, which come from divided pupil regions formed by dividing a pupil region of the photographic lens and to output second image signals having a phase difference; an imaging control unit configured to control the imaging unit so as to simultaneously image the first image signals and the second image signals; a parallax information calculation unit configured to calculate parallax information based on the second image signals outputted from the imaging unit; a plane image generation unit configured to generate a plane image based on the first image signals outputted from the imaging section; and a blurring processing unit configured to determine target pixels in the plane image which are subjected to blurring processing, based on the parallax information calculated by the parallax information calculation unit, and to perform blurring processing on the determined target pixels in the plane image.

A second aspect of the present invention provides an imaging device, further including: a recording unit configured to record the first image signal and the parallax information in association with each other, wherein the blurring processing unit determines target pixels in the plane image which are to be subjected to blurring processing, based on the parallax information recorded by the recording unit in association with the first image signals, and to perform blurring processing on the determined target pixels in the plane image.

A third aspect of the present invention provides an imaging device, wherein the parallax information includes a parallax map that indicates a parallax amount between corresponding points in a pair of the first image signals and the second image signals, and the blurring processing unit determines, as the target pixels which are to be subjected to the blurring processing, pixels constituting corresponding points, a parallax amount between which is equal to or more than a specified value, and performs the blurring processing on the target pixels.

A fourth aspect of the present invention provides an imaging device, further including: a contour information extraction unit configured to extract contour information at least from the first image signals, wherein the blurring processing unit determines target pixels which are to be subjected to blurring processing, based on the contour information extracted by the contour information extraction unit, and to perform blurring processing on the determined target pixels.

A fifth aspect of the present invention provides an imaging device, wherein the parallax information includes distance information of respective pixels, and the blurring processing unit determines, as the target pixels of the plane image which are to be subjected to the blurring processing, distant view pixels, distance information of which is larger than a first specified distance and/or close view pixels, distance information of which is smaller than a second specified distance, and performs the blurring processing on the target pixels.

A sixth aspect of the present invention provides an imaging device, wherein the blurring processing unit determines, as the target pixels of the plane image which are to be subjected to the blurring processing, pixels constituting an area specified by user operation, and performs the blurring processing on the target pixels.

A seventh aspect of the present invention provides an imaging device, wherein the parallax information includes a parallax map that indicates a parallax amount between corresponding points in the pair of the first image signals and the second image signals, and the blurring processing unit performs the blurring processing on the pixels constituting the respective corresponding points to an extent corresponding to the parallax amount between the corresponding points.

An eighth aspect of the present invention provides an imaging device, wherein the blurring processing unit performs on the target pixels the blurring processing to an extent as specified by user operation.

A ninth aspect of the present invention provides an imaging device, wherein the second pixels are placed at specified intervals in a pixel group corresponding to one or a plurality of color filters of specified arrangement.

A tenth aspect of the present invention provides an imaging device, wherein the second pixels are placed at specified intervals in a pixel group corresponding to green, red or blue color filters arranged according to Bayer array.

An eleventh aspect of the present invention provides an imaging device, further including: a diaphragm unit capable of adjusting an amount of luminous flux which forms images on the photoelectric conversion element groups of the imaging unit; and a diaphragm control unit configured to control an open amount of the diaphragm unit so that the phase difference of the second image signal outputted from the imaging unit can be acquired.

A twelfth aspect of the present invention provides an imaging method performed by an imaging device including an imaging unit having first pixels configured to photoelectrically convert, with use of a photoelectric conversion element group, a subject image which is imaged with a photographic lens and to output first image signals, and second pixels configured to be placed discretely between the first pixels so as to photoelectrically convert, with use of a photoelectric conversion element group, each of a plurality of subject images, which come from divided pupil regions formed by dividing a pupil region of the photographic lens and to output second image signals having a phase difference, the imaging method including: a step of controlling the imaging unit so as to simultaneously image the first image signal and the second image signal; a step of calculating parallax information based on the second image signals outputted from the imaging unit; a step of generating a plane image based on the first image signals outputted from the imaging unit; and a step of determining target pixels in the plane image which are to be subjected to blurring processing, based on the calculated parallax information, and performing blurring processing on the determined target pixels in the plane image.

According to this invention, a plane image is generated from the first image signals, out of the first image signals and the second image signals which have been simultaneously outputted, while parallax information is calculated based on the second image signals. Then, based on the calculated parallax information, target pixels in the plane image which are to be subjected to blurring processing are determined, and the blurring processing is performed on the determined target pixels in the plane image. As a consequence, in a pupil dividing-type imaging device, blurring can be applied to appropriate positions corresponding to the parallax information that indicates information such as the distance of a subject and the size of a parallax amount. Moreover, a stereoscopic image having parallax and a plane image can simultaneously be obtained by one photographing.

DETAILED DESCRIPTION OF THE PREFERRED EMBODIMENTS

First Embodiment

Figure 1:
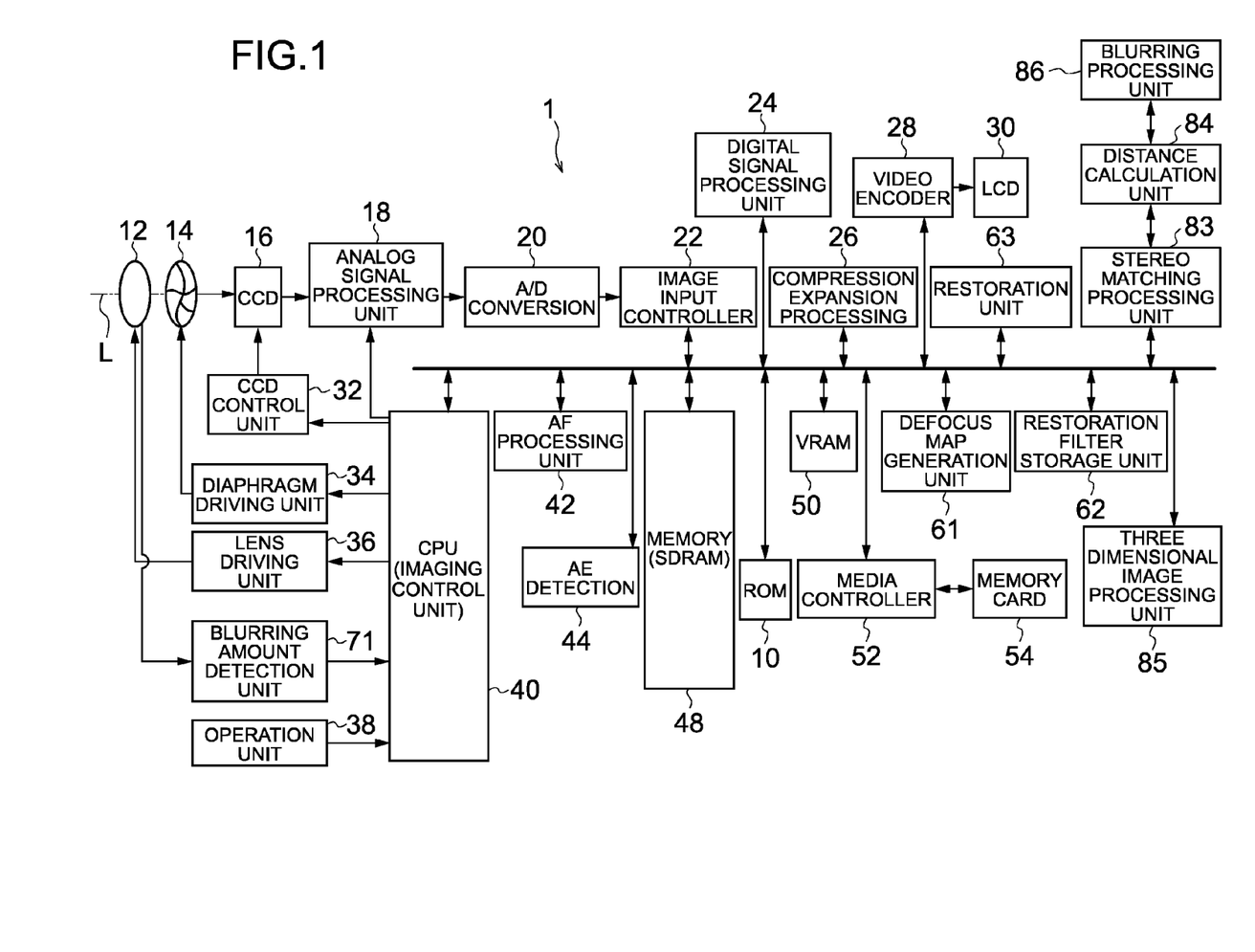
FIG. 1 is a block diagram of a camera according to a first embodiment.

FIG. 1 is a block diagram showing a mode for implementing a camera 1 according to the first embodiment.

The camera 1 is configured to record imaged images on a memory card 54, and the operation of the entire device is collectively controlled by a central processing unit (CPU) 40.

The camera 1 includes an operation unit 38 such as a shutter button, a mode dial, a reproduction button, a MENU/OK key, a cross key, and a BACK key. A signal from the operation unit 38 is inputted into the CPU 40, and the CPU 40 controls each circuit of the camera 1 based on inputted signals. For example, the operation unit 38 performs such control as lens drive control, diaphragm drive control, photographing operation control, image processing control, image data recording/reproduction control, and display control of an LCD monitor (LCD) 30 for stereoscopic display.

A ROM 10 stores programs executed by the CPU 40 and various data necessary for executing control, pixel defect information of the CCD 16, various constants/information relating to camera operation, and the like.

The shutter button, which is a manual operation button configured to input a photographing start instruction, is made of a two-stage stroke-type switch having an S1 switch that is turned on at the time of half pressing and an S2 switch that is turned on at the time of full pressing. The mode dial is selection means that selects any one of an auto photographing mode for photographing a static image, a manual photographing mode, a scene position such as person, scenery, and night view, and a dynamic image mode for taking a dynamic image.

The reproduction button is a button for switching to a reproduction mode in which photographed/recorded stereoscopic image (3D image) and plane image (2D image) are displayed in a static mode or a dynamic mode on the LCD 30. The MENU/OK key is an operation key configured to function as a menu button for instructing a menu to be displayed on the screen of the LCD 30, and as an OK button for instructing confirmation and execution of a selected content, or the like. The cross key is an operation unit that inputs an instruction of four directions of up, down, left and right directions, and functions as a button (cursor movement control means) for selecting an item from the menu screen or instructing selection of various setting items from each menu. The up/down key of the cross key functions as a zoom switch at the time of photographing or a reproduction zoom switch at the time of reproduction mode, while the left/right key functions as a frame-by-frame playback (forward/backward playback) button at the time of reproduction mode. The BACK key is used to delete a desired target such as a selection item, to cancel an instruction content, to undo previous operation, or the like.

In the photographing mode, image light representing a subject forms an image on a light receiving surface of a solid-state image sensor (hereinafter, referred to as a "CCD," though a "CMOS" is also applicable) 16 that is a phase difference image sensor capable of acquiring a pupil division parallax image through an imaging lens 12 and a diaphragm 14. The imaging lens 12 is driven by a lens driving unit 36 controlled by the CPU 40 and is subjected to focus control, zoom (focal length) control, and the like. For example, the diaphragm 14 is made up of five aperture blades and is driven by a diaphragm driving unit 34 controlled by the CPU 40, so that diaphragm control is performed in five stages in the range of diaphragm values (F values) of F2.8 to F11 in units of AV.

The CPU 40 controls the diaphragm 14 via the diaphragm driving unit 34 while executing control such as control on reading of charge storage time (shutter speed) in the CCD 16 and reading of image signals from the CCD 16 via a CCD control unit 32.

<Configuration Example of CCD>

Figure 2:
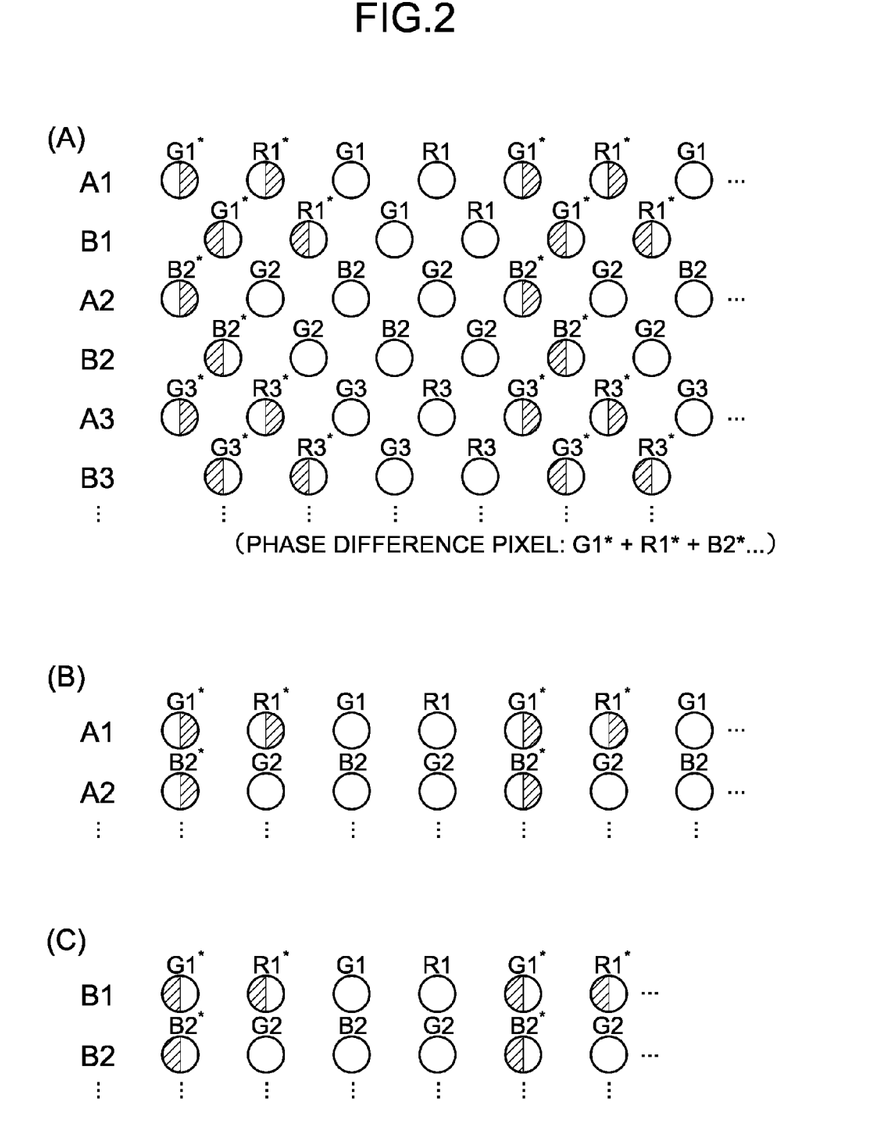
FIG. 2 is a view showing a configuration example of CCD image sensors for acquiring a pupil division parallax image according to the first embodiment.

FIG. 2 is a view showing a configuration example of the CCD 16.

As shown in (A) portion of FIG. 2, the CCD 16 has pixels of line A including odd lines A1, A2 . . . and pixels of line B including even lines B1, B2 . . . , each arrayed in a matrix form. Image signals for two surfaces, each photoelectrically converted by the pixels of these two lines A and B, may independently be read out. A plurality of light receiving elements corresponding to each pixel group form a valid pixel area for acquiring a valid imaging signal and an optical black area (hereinafter, referred to as an "OB area") for acquiring a black level reference signal. The OB area is actually formed so as to surround the periphery of the valid pixel area.

As shown in (B) portion of FIG. 2, the odd lines A of the CCD 16 include, out of pixels having color filters of R (red), G (green), and B (blue), a line with a pixel arrangement of GRGR . . . and a line with a pixel arrangement of BGBG . . . provided in an alternate manner. The color arrangement of the color filters as the entire odd lines A is a so-called Bayer array in which "G" and "B" are repeated in one direction and "G" and "R" are repeated in a direction orthogonal to the one direction.

A line with a pixel arrangement of GRGR . . . includes phase difference pixels G* and R* provided every four pixels. For example, a line with a pixel arrangement of G1R1G1R1 . . . includes phase difference pixels G1* and R1*.

A line with a pixel arrangement of BGBG . . . includes phase difference pixels provided every four pixels. For example, a line with a pixel arrangement of B2G2B2G2 . . . includes a phase difference pixel B*2.

Each of the phase difference pixels G*, R*, and B* has a pixel shielding section formed thereon, and in the case of imaging with the camera 1 being laterally placed, a right half of the light receiving surface of a photo diode PD of the pixel is shaded by the shielding member.

As shown in (C) portion of FIG. 2, pixels in the even lines B of the CCD 16 include a line with the pixel arrangement of GRGR . . . and a line with the pixel arrangement of BGBG . . . provided in an alternate manner as in the odd lines A, but the pixels of these even lines are positioned so as to be shifted from the pixels of the odd lines A toward the right side of a line direction by a half pitch. The color arrangement of the color filters as the entire even lines B is a so-called Bayer array. Since the arrangement of the color filters of the CCD 16 is formed by combining two Bayer arrays as a whole, the arrangement is also called Double Bayer array.

A line with a pixel arrangement of GRGR . . . includes phase difference pixels G* and R* provided every four pixels. For example, a line with a pixel arrangement of G1R1G1R1 . . . includes phase difference pixels G1* and R1*.

A line with a pixel arrangement of BGBG . . . includes a phase difference pixel B* provided every four pixels. For example, a line with a pixel arrangement of B2G2B2G2 . . . includes a phase difference pixel B2*.

Each of the phase difference pixels G*, R*, and B* has a pixel shielding section formed thereon, and in the case of imaging with the camera 1 being laterally placed, a left half of the light receiving surface of the photo diode PD of the pixel is shaded by the shielding member.

If the imaging lens 12 that forms a subject image on the CCD 16 is in focus, image signals from the phase difference pixels G*, R*, and B* in the odd lines A match with image signals from the phase difference pixels G*, R*, and B* in the even lines B. If in-focus points are on the front side or on the rear side of the light receiving surface of the CCD 16, a phase difference is generated between these image signals. A phase difference direction in the case where image formation points are on the front side is opposite to the direction in the case where the image formation points are on the rear side.

Figure 3:
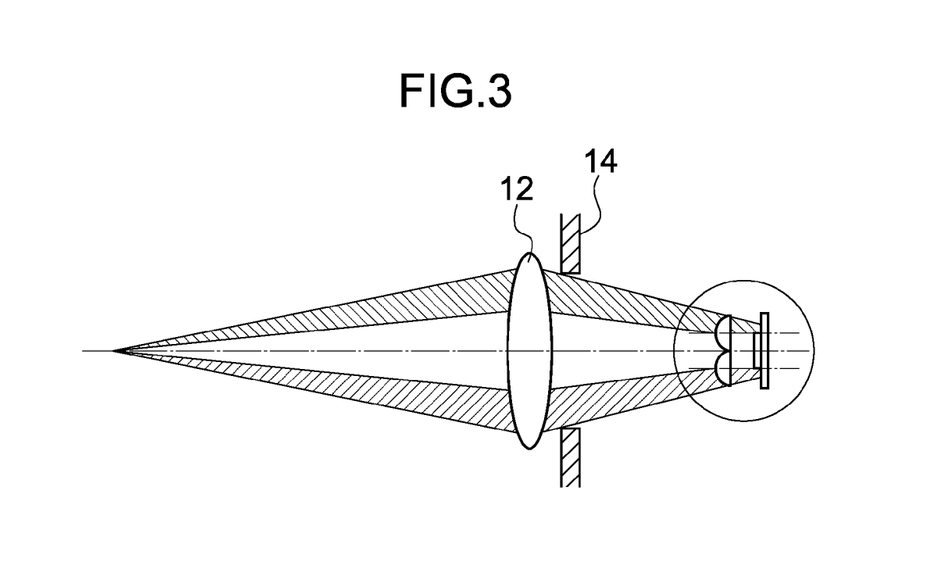
FIG. 3 is a view showing one pixel out of first and second pixels.
Figure 4:
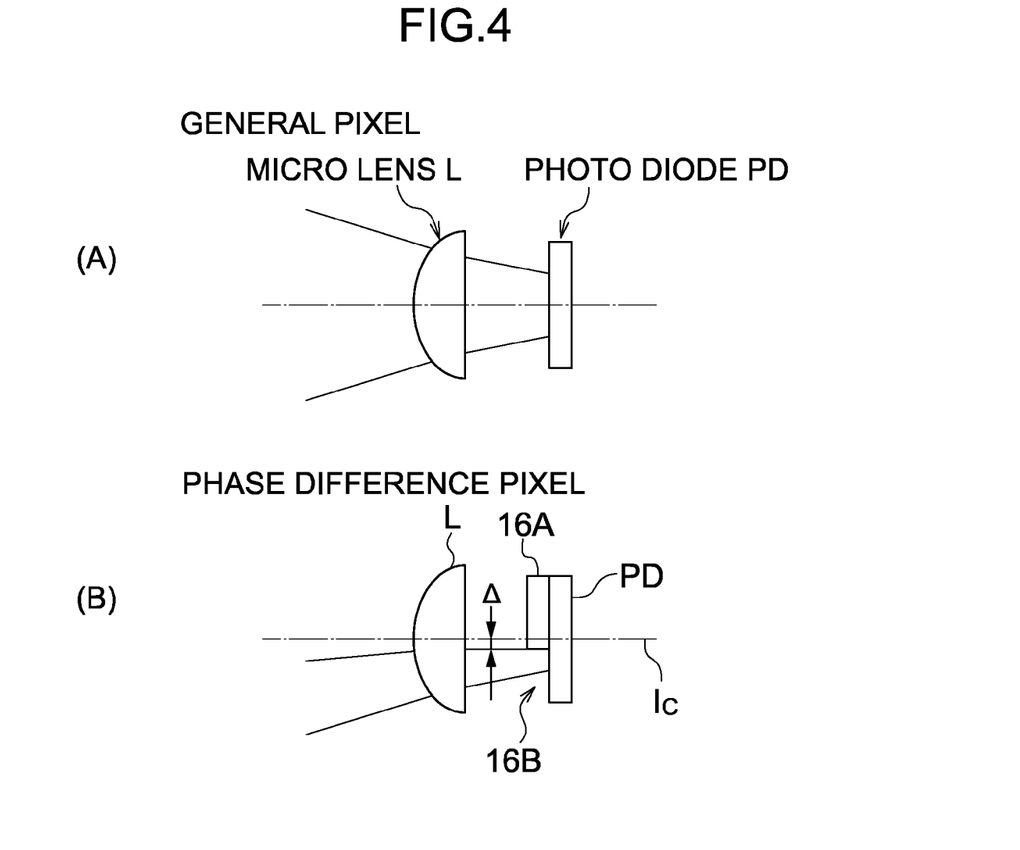
FIG. 4 is an expanded view showing a principal part of FIG. 3.

FIG. 3 is a view showing the imaging lens 12, the diaphragm 14, and phase difference pixels of the CCD 16 in (A) portion of FIG. 2. FIG. 4 is an expanded view showing a principal part of FIG. 3.

As shown in (A) portion of FIG. 4, luminous flux passing an exit pupil enters a general CCD pixel (photo diode PD) through a micro lens L without being limited.

On the contrary, as shown in (B) portion of FIG. 4, a shielding member 16A is formed on the phase difference pixels of the CCD 16. In the case of imaging with the camera 1 being laterally placed, a right half or a left half of the light receiving surface of the phase difference pixels (photo diode PD) is shaded by the shielding member 16A. On the other hand, in the case of imaging with the camera 1 being longitudinally placed, an upper half or a lower half of the light receiving surface of the phase difference pixels (photo diode PD) is shaded by the shielding member 16A. An opening 16B of the shielding member 16A is provided at a position deviated rightward, leftward, upward or downward (leftward from the optical axis in (B) portion of FIG. 4, for example) from an optical axis 1*c* of the micro lens L by a specified amount Δ. The luminous flux passes the opening 16B and reaches the light receiving surface of the photo diode PD. That is, the shielding member 16A functions as a pupil dividing member.

It is to be noted that the phase difference pixels in the odd line and the phase difference pixels in the even line are different in the area (a right half/left half area, or an upper half/lower half area) where luminous flux is limited by the shielding member 16A. For example, if the left half of luminous flux is limited in the phase difference pixels of the even line and the right half of luminous flux is limited in the phase difference pixels of the odd line, a right viewpoint image is obtained from the even line and a left viewpoint image is obtained from the odd line. Alternatively, if the upper half of luminous flux is limited in the phase difference pixels of the even line and a lower half of luminous flux is limited in the phase difference pixels of the odd line, a lower viewpoint image is obtained from the even line and an upper viewpoint image is obtained from the odd line.

Therefore, as shown in FIG. 11, in accordance with rear focus, in-focus, and front focus states, outputs of a first pixel (left viewpoint pixel) and a second pixel (right viewpoint pixel) are out of alignment or aligned in phase. Since a phase difference between output signals of the odd line and the even line corresponds to a defocus amount of the imaging lens 12, it becomes possible to execute AF control of the imaging lens 12 by detecting the phase difference (phase difference AF).

With reference again to FIG. 1, signal electric charges stored in the CCD 16 are read out as voltage signals corresponding to the signal electric charges based on a read-out signal added by the CCD control unit 32. A voltage signal read out from the CCD 16 is applied to an analog signal processing unit 18, where R, G, and B signals for each pixel is sample-held and amplified, before being applied to an A/D converter 20. The A/D converter 20 converts R, G, and B signals, which are sequentially inputted, into digital R, G, and B signals and outputs them to an image input controller 22.

A digital signal processing unit 24 performs specified signal processing, such as gain control processing including offset processing, white balance correction, and sensitivity correction, gamma correction processing, and YC processing, on digital image signals inputted via the image input controller 22.

Here, as shown in (B) and (C) portions of FIG. 2, image data read out from the phase difference pixel in the odd line of the CCD 16 is processed as left viewpoint image data, while image data read out from the phase difference pixel in the even line is processed as right viewpoint image data.

The left viewpoint image data and the right viewpoint image data (3D image data) which were processed in the digital signal processing unit 24 are inputted into a VRAM 50. The VRAM 50 includes an area A and an area B which store 3D image data each representing 3D images for one frame. In the VRAM 50, the 3D image data representing 3D image for one frame is alternately rewritten on the area A and the area B. Written 3D image data is read out from one of the area A and the area B of the VRAM 50, which is not the area where 3D image data is currently being rewritten. The 3D image data read out from the VRAM 50 is encoded in a video encoder 28 and outputted to the LCD monitor (LCD) 30 for stereoscopic display provided on the rear surface of the camera. As a consequence, a 3D subject image is displayed on the display screen of the LCD 30.

The LCD 30 is stereoscopic display means that can display, with a parallax barrier, stereoscopic images (left viewpoint image and right viewpoint image) as directive images each having specified directivity. However, the stereoscopic display system of the LCD 30 is not limited thereto, it may use lenticular lenses and may involve wearing of exclusive glasses, such as polarized glasses and liquid crystal shutter glasses, to enable viewers to view the left viewpoint image and the right viewpoint image in an individual manner.

Upon first stage-pressing (half pressing) of the shutter button of the operation unit 38, the CPU 40 starts AF operation and AE operation, and performs control so that a focus lens in the imaging lens 12 comes into an in-focus position via the lens driving unit 36. Image data outputted from the A/D converter 20 when the shutter button is half pressed is captured into an AE detection unit 44.

The AE detection unit 44 integrates G signals of the entire screen, or integrates weighted G signals, which are differently weighted between a middle portion and a peripheral portion of the screen, and outputs the resultant integrated value to the CPU 40. The CPU 40 calculates brightness (photographing Ev) of the subject from the integrated value inputted from the AE detection unit 44, determines a diaphragm value of the diaphragm 14 and an electronic shutter (shutter speed) of the CCD 16 based on the photographing Ev according to a specified program diagram so as to be able to obtain correct exposure, and controls the diaphragm 14 via a diaphragm driving unit 34 based on the determined diaphragm value (diaphragm control for a plane image), while controlling charge storage time in the CCD 16 via the CCD control unit 32 based on the determined shutter speed. It is to be noted that brightness of the subject may be calculated based on an external photometry sensor.

The specified program diagram shows photographing (exposure) conditions designed from a combination of the diaphragm value of the diaphragm 14 and the shutter speed of the CCD 16 or a combination of these parameters and photographing sensitivity (ISO sensitivity), corresponding to the brightness (photographing EV) of the subject.

Note that if the F value is made larger, parallax becomes smaller, whereas if the F value is fixed to a smaller value, parallax becomes larger. In response to the parallax instructed by a user via the operation unit 38, the F value and the program diagram may be changed. If the F value is fixed to a large constant value, it becomes possible to photograph an image in the state where the entire image is in-focus. In the present embodiment, since a plane image is obtained at the same time when a pair of images having parallax is obtained, the F value is fixed to a constant small value (parallax-oriented program diagram).

The parallax-oriented program diagram uses an F value fixed to a small constant value. By conducting photographing under photographing conditions determined according to the program diagram, it becomes possible to photograph a main image and a sub image having desired parallax irrespective of the brightness of the subject.

For example, the parallax-oriented program diagram is so designed that the F value takes a fixed value of 1.4 (AV=1), and with the photographing EV being in the range of 7 to 12 (being lighter), only the shutter speed is varied from 1/60 seconds (TV=6) to 1/2000 (TV=11) in accordance with the photographing EV. Further, the parallax-oriented program diagram is so designed that with the photographing EV being smaller than 7 (being darker), the ISO sensitivity is varied from 100 to 200, 400, 800, 1600, and 3200 as the photographing EV becomes smaller by 1 EV, in the fixed state of F value=1.4 and shutter speed=1/60 seconds. In other words, even when the subject is bright, the diaphragm 14 is not narrowed, but the shutter speed is slowed to adjust subject brightness.

An AF processing unit 42 is a unit that performs contrast AF processing or phase difference AF processing. In the case of performing the contrast AF processing, a high frequency component is extracted from image data in a specified focus area (rectangular area in the middle of the screen, etc.) at least in one image data out of left viewpoint image data and right viewpoint image data, and the high frequency component is integrated to calculate an AF evaluation value that indicates the in-focus state. AF control is implemented by controlling the focus lens in the imaging lens 12 so that the AF evaluation value is maximized. In the case of performing the phase difference AF processing, there is detected a phase difference between phase difference pixels within a specified focus area in the left viewpoint image data and the right viewpoint image data, and a defocus amount is calculated based on information indicating the phase difference. AF control is implemented by controlling the focus lens in the imaging lens 12 so that the defocus amount becomes 0.

Once AE operation and AF operation are finished and second stage-pressing (full pressing) of the shutter button is carried out, image data for two images including a left viewpoint image (first image) and a right viewpoint image (second image), which respectively correspond to the first pixels and the second pixels outputted from the A/D converter 20 in response to the pressing, is inputted from the image input controller 22 to a memory (SDRAM) 48 where the image data is temporarily stored.

The image data for two images temporarily stored in the memory 48 is suitably read out by the digital signal processing unit 24, which then performs specified signal processing including processing to generate luminance data and color difference data of the image data (YC processing). The image data (YC data) subjected to YC processing is again stored in the memory 48. Next, the YC data for two images are each outputted to a compression/expansion processing unit 26 where specified compression processing according to the JPEG (joint photographic experts group) or the like are executed, and then the data is again stored in the memory 48.

A multi-picture file (MP file: a file in the format where a plurality of images are concatenated) is generated from the YC data (compressed data) for two images stored in the memory 48. The MP file is read out by a media controller 52 and stored in a memory card 54.

A defocus map generation unit 61 calculates a phase difference between corresponding phase difference pixels between an odd line and an even line.

The defocus map generation unit 61 calculates a defocus amount based on the calculated phase difference between each of the phase difference pixels. A set of the defocus amounts corresponding to respective corresponding phase difference pixels is referred to as a defocusing map. The defocus map generation unit 61 has a volatile storage medium, such as a RAM, to temporarily store the obtained defocusing map. The defocus map generation unit 61 may detect corresponding points between the respective phase difference pixels in a stereo matching processing unit 83, and may generate a defocusing map based on a difference in position information between those corresponding points.

Further, based on the calculated defocus amounts between the respective phase difference pixels, the defocus map generation unit 61 also calculates the defocus amount of pixels, the corresponding points of which have not originally been calculated and the defocus amount of non-phase difference pixels, the corresponding points of which could not be calculated. More specifically, a dense defocusing map can be obtained by performing interpolation processing with use of the defocus amount of a phase difference pixel adjacent to the non-phase difference pixel. A pixel for use in interpolation of the defocus amount of a certain non-phase difference pixel is an adjacent pixel of the same color.

A restoration filter storage unit 62 is made of a nonvolatile storage medium, such as a ROM, and stores a restoration filter corresponding to an image height (a distance from an image center, typically a distance from an optical axis center L of the imaging lens 12) and a defocus amount (or subject distance) in each small area in each viewpoint image.

A restoration unit 63 performs deconvolution of small areas in each viewpoint image with a restoration filter selected for each small area so as to restore the small areas in the corresponding viewpoint image. This signal processing removes blurring in the optical system, more particularly blurring of an image corresponding to the pixels in the periphery of the light receiving surface where unbalanced incidence of luminous flux occurs. A blurless plane image can be obtained by synthesizing these deblurred two viewpoint images.

The stereo matching processing unit (object detection means) 83 is configured to detect one or more corresponding points (objects) that correspond to each other between two pieces of image data A and B stored in the memory 48 at the same timing. It is to be noted that for the processing method in the stereo matching processing unit 83, publicly known technologies that use methods such as an area-based method, a segment-based method, and an isophote method, can be employed. Moreover, both passive stereo matching and active stereo matching may be used. Stereo matching between images different in number of pixels can be performed based on publicly known technologies as disclosed in, for example, Patent Literatures 3, 7 to 11.

A distance calculation unit 84 calculates three-dimensional coordinate values (distance information) of the corresponding points detected by the above-stated stereo matching processing unit 83. In the method for calculating distance information in the distance calculation unit 84, a publicly known technology that involves calculation based on the principle of triangulation may be used. It is to be noted that the stereo matching processing unit 83 and the distance calculation unit 84 may be configured by a program, or an IC, an LSI, or the like.

A parallax map (in which a parallax amount between a corresponding point of a reference viewpoint image, e.g., image data A and a corresponding point of another viewpoint image, e.g., image data B, expresses the other viewpoint image) is technically equivalent to distance information or defocus map, and so that the following processing with respect to distance information or defocus map may also be applied to the parallax map. Further, information on a distance to the subject, defocus map or a parallax map is collectively referred to as parallax information. Calculation of the parallax information may also be performed not in the camera 1 but in other information processing apparatuses like personal computers and control programs thereof.

Obtained pixels in the first image data and obtained pixels in the second image data may be identical or may be different in configuration. Although the first image data has color information and brightness information, the second image data may have only the brightness information. Alternatively, the second pixel may be a monochrome CCD that can receive signals of an infrared region, and active stereo matching with infrared light may be employed as in Patent Literature 7.

Hereinafter, in order to enable stereo matching, both the first image data and the second image data are configured to include at least the brightness information. In order to add color information to a two-dimensional image, both the first image data and the second image data are preferably configured to include the color information. Herein, to simplify explanation, both the first image data and the second image data are configured to include the brightness information and the color information.

A three-dimensional image processing unit 85 can generate a three-dimensional image from a pair of viewpoint images acquired from the CCD 16. This is similar to the configuration in Patent Literature 2. It is to be noted that three-dimensional image generation from parallax information can be performed based on known technologies as seen in Patent Literatures 7 to 11. Three-dimensional image generation is carried out when the photographing mode is set to "3D static image recording," by which a stereoscopic image having a desired parallax amount is displayed on the LCD 30.

The parallax amount of a three-dimensional image generated by a three-dimensional image processing unit 45 may be a fixed value or an arbitrary set value.

A blurring processing unit 86 performs low pass filter processing that removes image signal components in the range with a predetermined frequency or more.

Figure 5:
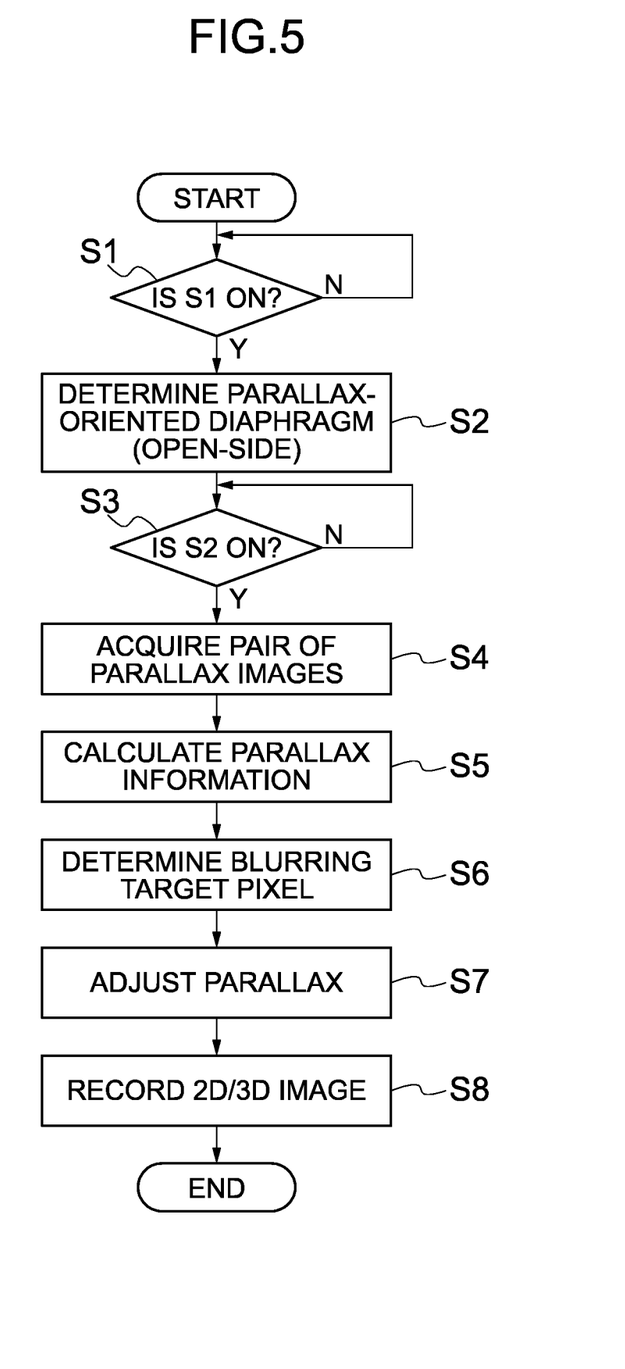
FIG. 5 is a flow chart of 2D/3D simultaneous imaging processing.

FIG. 5 shows a flow chart of 2D/3D simultaneous imaging processing according to the preferred first embodiment of the present invention. This processing is started in response to the photographing mode being set to "2D/3D simultaneous recording." This processing is prescribed in a program executed by the CPU 40 and is stored in the memory (ROM) 48 and the like.

In S1, the CPU 40 determines whether or not first stage-pressing (half pressing) of the shutter button of the operation unit 38 is carried out. If Yes, the procedure proceeds to S2, whereas if No, the determination processing is repeated. During these procedures, an image acquired from the CCD 16 can be displayed on the LCD 30 as a 2D or 3D through image. Which through image is displayed, 2D or 3D, may arbitrarily be selected in the operation unit 38.

In S2, in response to the photographing mode being set to "2D/3D simultaneous recording," the CPU 40 determines a diaphragm value X and a shutter speed according to the parallax-oriented program diagram.

In S3, the CPU 40 determines whether or not second stage-pressing (full pressing) of the shutter button of the operation unit 38 is carried out. If Yes, the procedure proceeds to S4, whereas if No, the determination processing is repeated. During these procedures, an image acquired from the CCD 16 can be displayed on the LCD 30 as a 2D or 3D through image.

In S4, the CPU 40 controls the diaphragm 14 via the diaphragm driving unit 34 based on the diaphragm value X determined in S2 (parallax-oriented diaphragm control), while controlling charge storage time in the CCD 16 via the CCD control unit 32 based on the determined shutter speed. As a consequence, right and left image data A and B (a pair of viewpoint images) in which the parallax pixels R*G*B* have parallax whereas the other pixels have no parallax are acquired from the CCD 16. The CPU 40 stores the right and left image data A and B in the VRAM 50 as 3D image data.

The CPU 40 adds up image signals for every two pixels which correspond to one pupil-divided luminous flux for the right and left image data A and B. As a consequence, a 2D image with high resolution is generated. The CPU 40 stores the added image signals in the VRAM 50 as 2D image data. Note that for image signals corresponding to phase difference pixels in the 2D image data, it is preferable to perform deblur processing by interpolation based on image signals from non-phase difference pixels which are provided around the pertinent phase difference pixels and which have the same color as the phase difference pixels, or the like.

The 2D image data may be one of the images that are displayed as a 2D post view image on the LCD 30, or may be different from the 2D post view image.

In S5, the CPU 40 causes the stereo matching processing unit 83 and the distance calculation unit 84 to calculate stereo matching and distance information (parallax information). The stereo matching processing unit 83 performs stereo matching based on the 3D image data A and B acquired in S3. The distance calculation unit 84 calculates distance information for each corresponding point detected by the stereo matching processing unit 83. Then, based on the thus-calculated distance information, distance information is also calculated relating to the points (pixels) where the corresponding points between the image data A and B have not originally been calculated and relating to the non-corresponding points (pixels) where corresponding points could not be calculated. This calculation may be implemented by interpolation processing with use of calculated adjacent parallax information as in the case of Patent Literature 15. As a consequence, a distribution of dense parallax information corresponding to each of the pixels in the 2D image data is acquired.

In S6, the blurring processing unit 86 determines blurring target pixels in the 2D image data, based on the distance information (parallax information) for each corresponding point calculated in S5. A detail of determination of the blurring target pixels is described later.

In S7, the restoration unit 63 adjusts every pixel in 2D image data except blurring target pixels so that their parallax (defocus amount) becomes 0. The parallax adjustment may be performed according to publicly known technologies such as the methods disclosed in Patent Literatures 2 and 15. With the parallax adjustment, a blur between corresponding pixels, among the pixels except the blurring target pixels, is restored. The blurring processing unit 86 performs the blurring processing on the determined target pixels which are to be subjected to blurring processing. A detail of the blurring processing is described later.

In S8, the CPU 40 compresses and records the 2D image data processed in S7 in the memory card 54. The CPU 40 may also compress and record 3D image data or parallax information in the memory card 54 together with the 2D image data or separately from the 2D image data. Further in the case where the 2D image data and parallax information are compressed and recorded in associated with each other in the memory card 54, an information processing apparatus, such as the camera 1 and a personal computer, may read out the 2D image data and the parallax information from the memory card 54, and perform blurring processing which is similar to the following blurring processing performed by the blurring processing unit 86, based on the parallax information associated with the read 2D image data.

Further, the video encoder 28 can display on the LCD 30 a 3D image having parallax which has been adjusted to be in a desired range (strong, middle, or small) based on the 3D image data and the parallax information. Parallax adjustment corresponding to visual conditions is performed according to publicly known technologies. For example, the parallax is adjusted based on the lateral width size and viewing distance of the LCD 30 as in Patent Literature 16.

In this case, determination of the blurring target pixels in S6 is made automatically. However, the target pixels may additionally be determined based on user operation. For example, pixels are determined as a target of blurring processing as shown below.

Example 1 the blurring processing unit 86 refers to distance information of each pixel to determine, as the blurring target pixels, distant view pixels with a distance larger than a first specified distance (for example, pixels of a subject image with a distance of 5 m or more) or close view pixels with a distance smaller than a second specified distance (for example, pixels of a subject image with a distance of 50 cm or less).

Example 2 the blurring processing unit 86 refers to a parallax map of each pixel to determine, as the blurring target pixels, pixels constituting the corresponding points at which a parallax amount between the corresponding points is equal to or larger than a specified value (for example, a value equal to two pixels).

Example 3 in addition to Example 1 and/or Example 2, the blurring processing unit 86 extracts contour information (high-frequency components of image signals) from 2D image data, and determines pixels constituting a background area which is outside a contour component, as the blurring target pixels. Note that when edge components of a subject concentrate in the vicinity of phase difference pixels, accurate extraction of contour information may possibly be hindered. Accordingly, it is preferable to discretely place the phase difference pixels.

Example 4 in addition to Example 1, Example 2 and/or Example 3, the blurring processing unit 86 determines each pixel included in an area specified by user operation as the blurring processing target pixels.

Further, the extent of blurring processing in S7 may be determined based on user operation, or may be determined automatically.

For example, when a user specifies strong blurring, the blurring processing unit 86 sets $\alpha$ as a parallax amount between corresponding points of the blurring target pixels. When middle blurring is specified, $\beta$ is set as the parallax amount, and when small blurring is specified, $\gamma$ is set as the parallax amount. Here, the relationship of $\alpha<\beta<\gamma$ is established.

Alternatively, the blurring processing unit 86 may vary the extent of blurring in accordance with the parallax amount indicated in the parallax map. In short, if the parallax amount between certain corresponding points is large, then the extent of blurring in these corresponding points is increased in accordance to the extent, with use of a low-pass filter or the like.

As described in the foregoing, the camera 1 images a pair of viewpoint images under parallax-oriented diaphragm control, and acquires parallax information from the pair of viewpoint images. The camera 1 then determines a portion of the 2D image where blurring processing is performed, based on the parallax information, and performs the blurring processing on the portion. In this way, a pupil dividing-type imaging device can simultaneously obtain a plane image and a parallax image with blurring being applied to appropriate positions corresponding to the parallax information that indicates information such as the distance of a subject and the size of a parallax amount. Moreover, since photographing is carried out on an open aperture side, it becomes possible to image in a dark scene with high photographing sensitivity.

Second Embodiment

Figure 6:
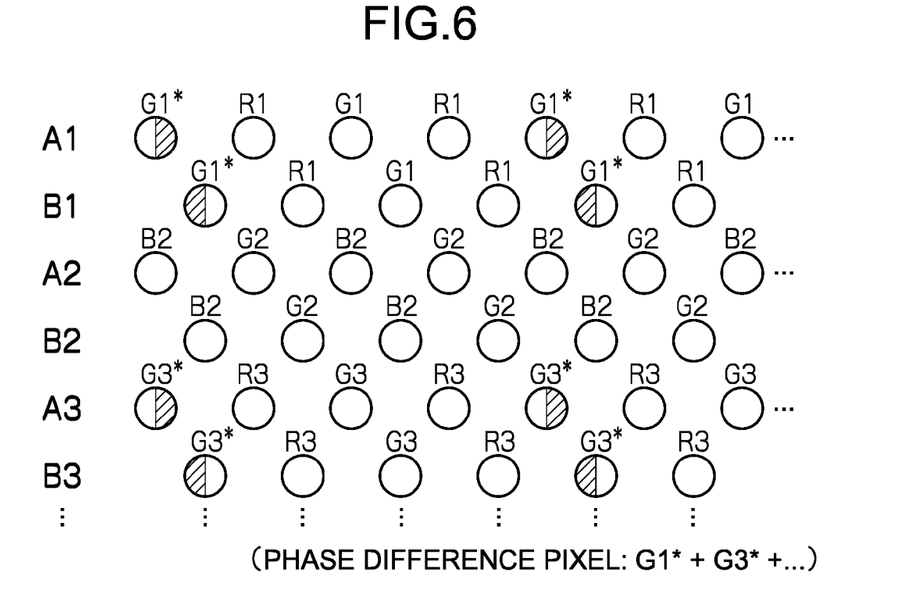
FIG. 6 is a view showing a configuration example of CCD image sensors (G* pixels) for acquiring a pupil division parallax image according to a second embodiment.

The arrangement of the phase difference pixels is not limited to the arrangement shown in FIG. 2, but various kinds of arrangements may be adopted. For example, as shown in FIG. 6, G pixels in respective first pairs of odd lines and even lines A1 and B1 include a phase difference pixel every four pixels, and G pixels in respective next pairs of lines A2 and B2 include no phase difference pixel. Furthermore, in respective next pairs of the lines A3 and B3, the pixels include a phase difference pixel every four pixels. This pattern is repeated in a similar manner so that every other pair of lines A and B includes phase difference pixels G. In this case, a pixel for use in interpolation of the defocus amount of a G pixel that is a non-phase difference G pixel is an adjacent phase difference G pixel of the same color. Moreover, a pixel for use in interpolation of the defocus amount of BG pixels that are non-phase difference pixels is an adjacent phase difference pixel G.

Figure 7:
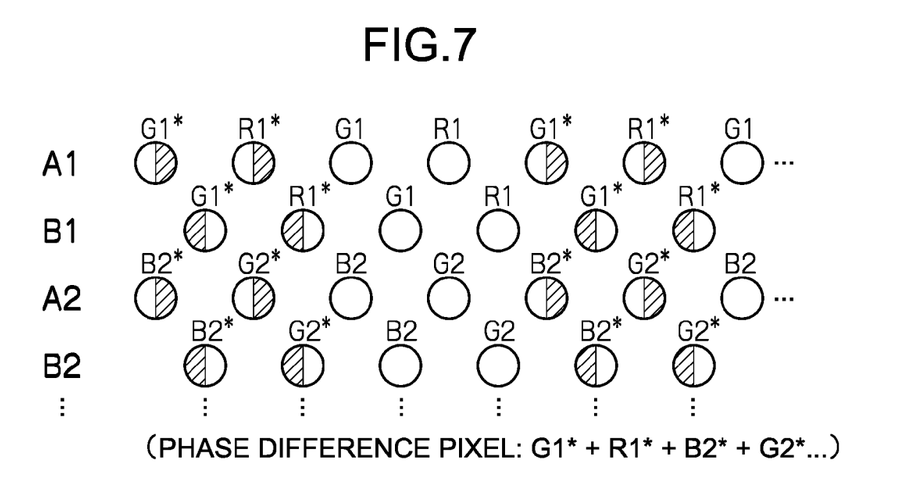
FIG. 7 is a view showing a configuration example of CCD image sensors (R*, G*, and B* pixels) for acquiring a pupil division parallax image according to the second embodiment.

Alternatively, all the R, G, and B pixels in the odd and even lines may include a phase difference pixel placed every four pixels as shown in FIG. 7.

Alternatively, a distribution range of the phase difference pixels does not extend to the whole effective pixels but may be a local area such as an area around the center of the screen and an area excluding a periphery of the screen.

Further, the number of pitches between the phase difference pixels is not limited to four pixels but may be more than or less than four pixels. However, when the number of pitches between the phase difference pixels is four pixels, pixels RGB are typically present between phase difference pixels, and image signals of the phase difference pixels can be interpolated with surrounding general pixels. Accordingly, the optimum number of pitches is four pixels.

Figure 8:
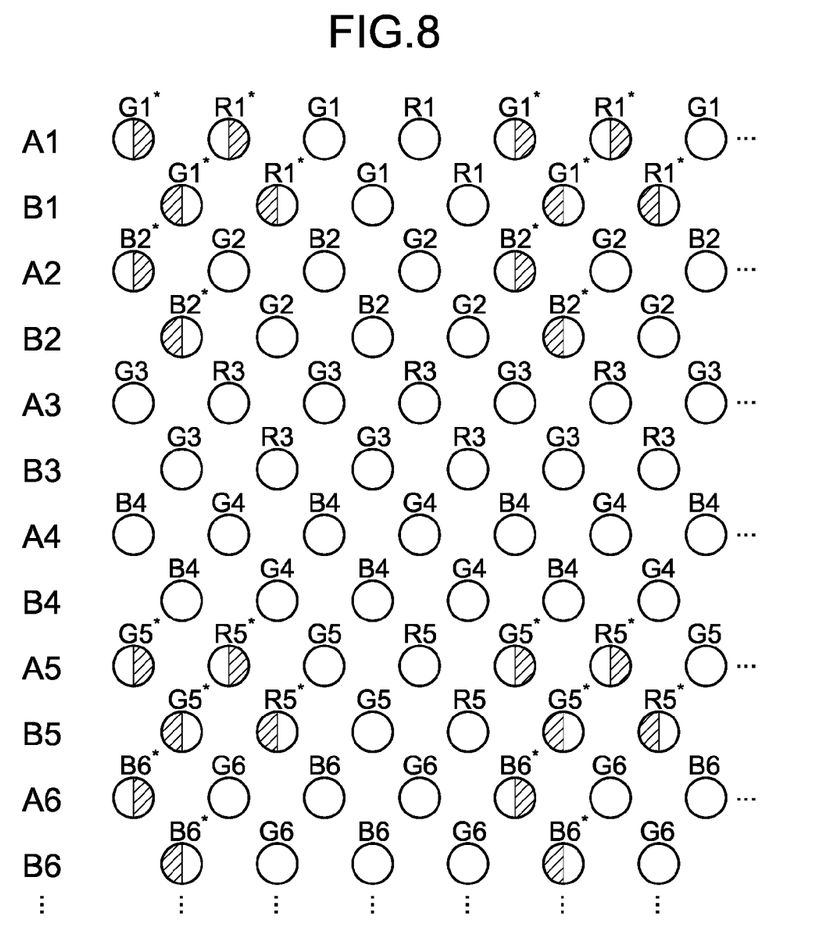
FIG. 8 is a view showing a configuration example of CCD image sensors (vertical/horizontal four-pitch R*, G*, and B* pixels) for acquiring a pupil division parallax image according to the second embodiment.

Therefore, for example, a phase difference pixel may be placed at pitches of four pixels in both the vertical and horizontal directions as shown in FIG. 8. In FIG. 8, the lines A3, B3, A4, and B4 have general pixel arrangement, whereas in the lines A5, B5, A6, and B6 which are horizontally separated by four pixels from the lines A1, B1, A2, and B2, the phase difference pixels G*, R*, and B* are placed every four pixels in the horizontal direction as in the lines A1, B1, A2, and B2 of FIG. 2. Although not shown in the drawings, the phase difference pixels in the horizontal lines in FIGS. 6 and 7 may also be placed in every line which is vertically separated by four pixels from the horizontal lines.

As the color of pixels that serve as the phase difference pixels increases, accuracy in phase difference detection with respect to respective colors can proportionally be enhanced. Moreover, as the number of pitches between the phase difference pixels increases, interpolation processing with respect to the phase difference proportionally decreases, and so the accuracy in detecting a phase difference between corresponding points can be enhanced.

However, since increased phase difference pixels may possibly affect the image quality of 2D images, it is preferable to determine the placement of the phase difference pixels in consideration of both the image qualities of 2D and 3D images.

Third Embodiment

Figure 9:
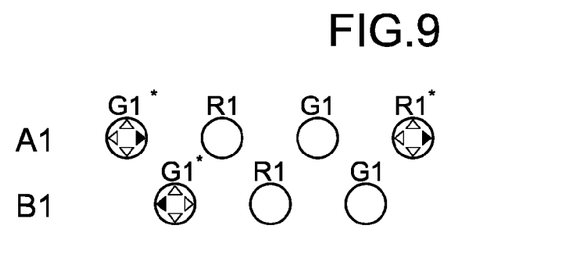
FIG. 9 is a view showing a configuration example of CCD image sensors (micro lenses) for acquiring a pupil division parallax image according to a third embodiment.

In the above-configured CCD 16, although the phase difference pixels in the odd lines and even lines are configured to be different in areas (right half and left half) where luminous flux is limited by the shielding member 16A, the configuration of the CCD 16 is not limited thereto. Instead of providing the shielding member 16A, the micro lens L and the photo diode PD may relatively be shifted in a horizontal direction, and luminous flux which comes incident into the photo diode PD may be limited depending on the shift direction. Further, luminous flux which comes incident into each pixel may be limited by one micro lens provided for two or more phase difference pixels in the odd lines and even lines (FIG. 9), or pupil division may be achieved by a mirror (FIG. 10 for example).

What is claimed is:

1. An imaging device, comprising:
an imaging unit having first pixels configured to photoelectrically convert, with use of a photoelectric conversion element group, a subject image which is imaged with a photographic lens and to output a first image signal, and second pixels configured to be placed discretely between the first pixels so as to photoelectrically convert, with use of the photoelectric conversion element group, each of a plurality of subject images which come from divided pupil regions formed by dividing a pupil region of the photographic lens and to output second image signals having a phase difference;
an imaging control unit configured to control the imaging unit so as to simultaneously image the first image signals and the second image signals;
a parallax information calculation unit configured to calculate parallax information based on the second image signals outputted from the imaging unit;
a plane image generation unit configured to generate a plane image based on the first image signals outputted from the imaging section; and
a blurring processing unit configured to determine target pixels in the plane image which are to be subjected to blurring processing, based on the parallax information calculated by the parallax information calculation unit, and to perform blurring processing on the determined target pixels in the plane image.

2. The imaging device according to claim 1, further comprising
a recording unit configured to record the first image signals and the parallax information in association with each other, wherein
the blurring processing unit determines the target pixels in the plane image which are to be subjected to blurring processing, based on the parallax information recorded by the recording unit in association with the first image signals, and to perform blurring processing on the determined target pixels in the plane image.

3. The imaging device according to claim 1, wherein
the parallax information includes a parallax map that indicates a parallax amount between corresponding points in the pair of the first image signals and the second image signals, and
the blurring processing unit determines, as the target pixels to be subjected to the blurring processing, pixels constituting corresponding points, a parallax amount between which is equal to or more than a specified value, and performs the blurring processing on the target pixels.

4. The imaging device according to claim 1, further comprising
a contour information extraction unit configured to extract contour information at least from the first image signals, wherein
the blurring processing unit determines the target pixels which are to be subjected to blurring processing, based on the contour information extracted by the contour information extraction unit, and to perform blurring processing on the determined target pixels.

5. The imaging device according to claim 1, wherein
the parallax information includes distance information of respective pixels, and
the blurring processing unit determines, as the target pixels of the plane image which are to be subjected to blurring processing, distant view pixels, distance information of which is larger than a first specified distance and/or close view pixels, distance information of which is smaller than a second specified distance, and performs blurring processing on the target pixels.

6. The imaging device according to claim 1, wherein
the blurring processing unit determines, as the target pixels of the plane image which are to be subjected to the blurring processing, pixels constituting an area specified by user operation, and performs the blurring processing on the target pixels.

7. The imaging device according to claim 1, wherein
the parallax information includes a parallax map that indicates a parallax amount between corresponding points in the pair of the first image signals and the second image signals, and
the blurring processing unit performs the blurring processing on pixels constituting the respective corresponding points to an extent corresponding to the parallax amount between the corresponding points.

8. The imaging device according to claim 1, wherein
the blurring processing unit performs the blurring processing on the target pixels to an extent specified by user operation.

9. The imaging device according to claim 1, wherein
the second pixels are placed at specified intervals in a pixel group corresponding to one or a plurality of color filters of specified arrangement.

10. The imaging device according to claim 9, wherein
the second pixels are placed at specified intervals in a pixel group corresponding to green, red or blue color filters arranged according to Bayer array.

11. The imaging device according to claim 1, further comprising:
a diaphragm unit capable of adjusting an amount of luminous flux which forms images on the photoelectric conversion element groups of the imaging unit; and
a diaphragm control unit configured to control an open amount of the diaphragm unit so that the phase difference of the second image signal outputted from the imaging unit can be acquired.

12. An imaging method performed by an imaging device including an imaging unit having: first pixels configured to photoelectrically convert, with use of a photoelectric conversion element group, a subject image which is imaged with a photographic lens and to output first image signals; and second pixels configured to be placed discretely between the first pixels so as to photoelectrically convert, with use of a photoelectric conversion element group, each of a plurality of subject images, which come from divided pupil regions formed by dividing a pupil region of the photographic lens and to output second image signals having a phase difference, the imaging method comprising:
a step of controlling the imaging unit so as to simultaneously image the first image signals and the second image signals;
a step of calculating parallax information based on the second image signals outputted from the imaging unit;
a step of generating a plane image based on the first image signals outputted from the imaging unit; and
a step of determining target pixels in the plane image which are to be subjected to blurring processing, based on the calculated parallax information, and performing blurring processing on the determined target pixels in the plane image.

* * * * *